Patented Dec. 12, 1922.

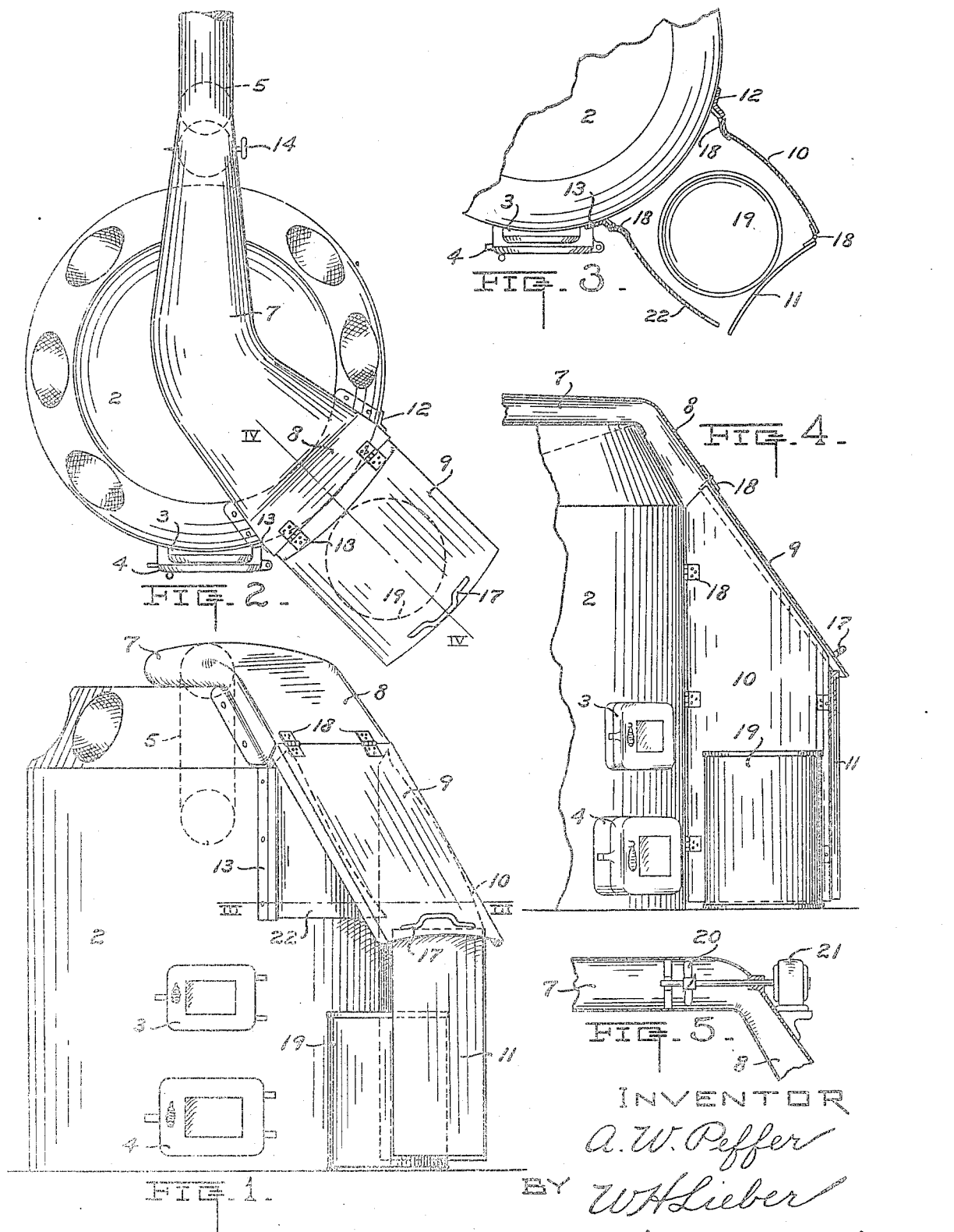

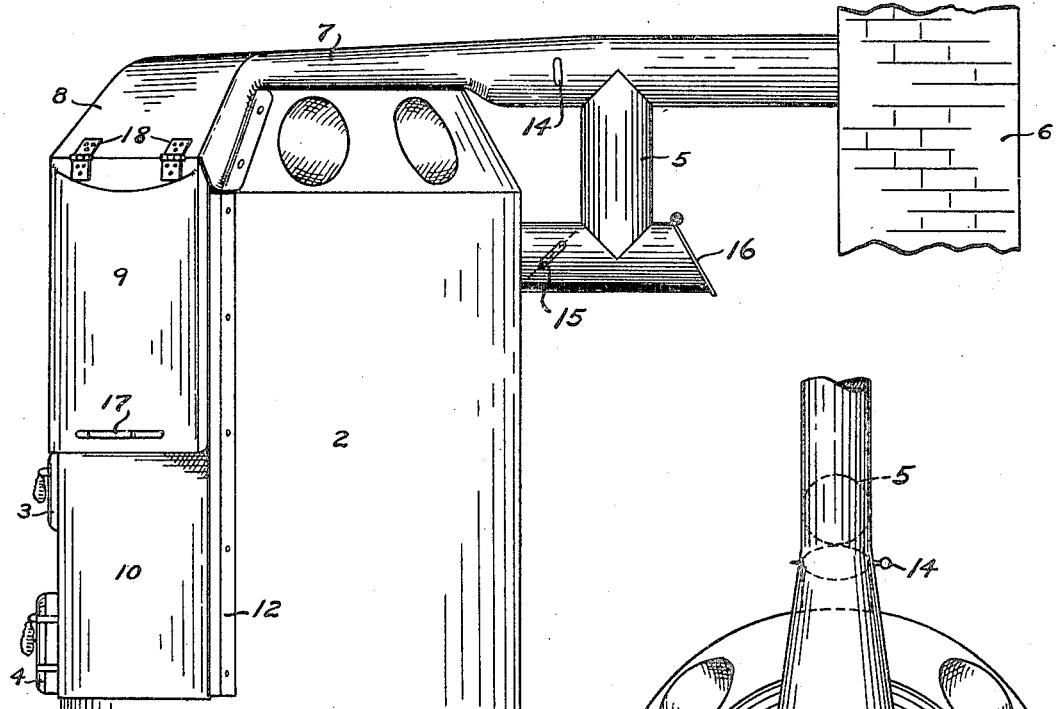
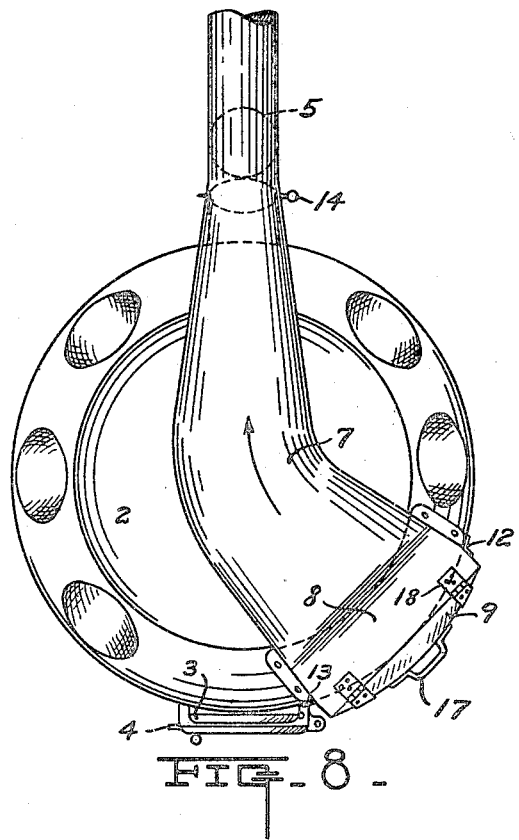
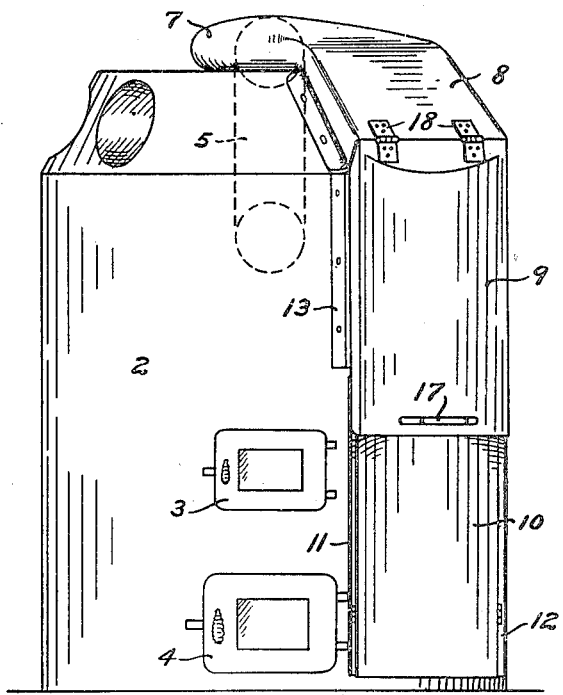

1,438,719

UNITED STATES PATENT OFFICE.

ARTHUR W. PEFFER, OF MILWAUKEE, WISCONSIN.

DUST REMOVER.

Application filed February 13, 1922. Serial No. 536,065.

*To all whom it may concern:*

Be it known that ARTHUR W. PEFFER, a citizen of the United States, residing at Milwaukee, in the county of Milwaukee and State of Wisconsin, has invented a certain new and useful Dust Remover, of which the following is a specification.

This invention relates in general to improvements in the art of removing air and other gases from inclosures, and relates more specifically to improvements in the construction and operation of apparatus which is adapted to automatically remove dust laden air and other objectionable gases from the heater or furnace rooms of residences, factories and other buildings.

An object of the invention is to provide a dust or gas remover, which is simple in construction and efficient in operation.

It has heretofore been proposed to remove ash dust from furnace rooms, by providing a downwardly open hood located above an ash receptacle and having its discharge in communication with the furnace gas discharge conduit, so that the natural draft created by the heat generated in the furnace might withdraw the dust laden air from the vicinity of the receptacle. The prior ash dust removers are objectionable because they are bulky and occupy considerable space, thereby making their use undesirable in the basements or other furnace rooms of residences which as a rule are of limited capacity and are ordinarily overcrowded with other objects. Another objection to the prior dust removers is the fact that they are ordinarily constructed as appliances which are furnished independent of and separate from the furnace or heater with which they are intended to cooperate. A further objection to the devices of the prior art, is that they have limited capacity and efficiency due to the fact that their operation depends entirely upon the natural draft created by the heat generated in the furnace. These and other objectionable features have cooperated to make the prior proposed ash dust removers generally unsatisfactory and of but slight commercial value.

The present invention contemplates the provision of an ash dust remover of the general type previously referred to, which positively eliminates the objections of the prior devices. The improved dust remover is exceedingly compact and neat in its construction, being collapsible against a wall of the heater when not in use, thereby occupying minimum space. The apparatus forming the subject of the present invention, is especially adapted for direct attachment to any of the standard heaters or furnaces, thus making it possible to furnish the combined heater and dust remover as a single unit. Another specific object and advantage of the present invention is the provision of automatically acting and mechanically operable means for augmenting the flow of dust laden air and gases through the remover, thereby reducing the size of the apparatus to a minimum and enhancing its capacity and efficiency. The improved apparatus is furthermore constructed to provide an insulating chamber or air pocket above the furnace with which it cooperates, thereby serving to prevent overheating of structure located near the furnace walls. The improved dust collector is especially designed to avoid interference with the normal operation of the heater and may be manufactured and installed at relatively moderate cost. These and other objects and advantages of the present invention will be apparent from the following description.

While the invention has been illustrated herein as being specifically applied to a hot air furnace, it will be obvious that its scope should not be limited by such specific disclosure, and that the principles involved are generally applicable to many other forms of heating appliances.

A clear conception of several embodiments of the invention and of the operation of devices constructed in accordance therewith, may be had by referring to the drawings accompanying and forming a part of this specification, in which like reference characters designate the same or similar parts in the various views.

Fig. 1 is a front elevation of a combined ash dust remover and hot air furnace, the dust remover being shown in open position ready for use.

Fig. 2 is a top view of a combined ash dust remover and hot air furnace, the dust remover being shown in open position.

Fig. 3 is a horizontal section through an ash dust remover in open position, showing the same attached to a fragment of a furnace, the section being taken along the line III—III of Fig. 1 looking down.

Fig. 4 is a central vertical section through an ash dust remover in open position, showing the same attached to a fragment of a furnace, the section being taken along the line IV—IV of Fig. 2 looking toward the rear of the remover.

Fig. 5 is a fragmentary vertical section of a motor driven pump unit for augmenting the flow of dust laden air through a dust remover.

Fig. 6 is a front elevation of a combined ash dust remover and hot air furnace, the dust remover being folded against a wall of the furnace.

Fig. 7 is a side elevation of a combined ash dust remover and hot air furnace, the dust remover being folded against a wall of the furnace.

Fig. 8 is a top view of a combined ash dust remover and hot air furnace, the dust remover being folded against a wall of the furnace.

The hot air furnace to which the improved ash dust remover is herein illustrated as specifically applied, comprises in general a cylindrical body or casing 2 forming a housing for the air heating chamber, the combustion chamber, the fire pot and the ash pit; a fire door 3 for permitting delivery of fuel and air to the combustion chamber; an ash pit door 4 for permitting removal of ashes from the ash pit; and a discharge conduit or pipe 5 for permitting escape of gaseous products of combustion to the chimney 6. The furnace casing 2 is ordinarily formed of sheet metal and is provided with suitable cold air inlet and warm air discharge openings, the former of which are usually located near the rear lower portion of the casing and the latter of which are shown as being located near the top of the casing 2. The discharge pipe 5 is provided with a check valve 15 and a damper 16 cooperable with slides in the doors 3, 4 to normally control the operation of the furnace.

The ash dust remover which forms the subject of the present invention, comprises a collapsible casing formed of plates 9, 10, 11, 22 which are pivotally attached directly to the furnace casing 2, by means of hinges 18 or the like. The dust remover plates 9, 10, 11, 22 are preferably formed of sheet metal and are shaped to conform generally with the contour of the furnace wall against which the plates lie when the device is folded together as shown in Figs. 6, 7 and 8. If the furnace is of cylindrical form as shown, the plates 9, 10, 11, 22 preferably have a radius of curvature approximately that of the casing 2, but in cases where the furnace wall consists of plane sections, the remover plates 9, 10, 11, 22 may be formed as plane sheets.

The top plate 9 of the dust remover is attached to the discharge conduit casing 8 by means of hinges 18 having horizontal pivots, and has longitudinal side flanges and a manipulating handle 17. The rear side plate 10 is attached to an upright angle bar 12 riveted or otherwise secured to the casing 2, by means of hinges 18 having vertical pivots, and has an upper inclined edge coactable with and forming a support for one side of the top plate 9 when the dust remover is in open position. The front plate 11 is attached to the vertical outer edge of the side plate 10 by means of hinges 18 having vertical pivots, and has an upper edge which is coactable with and forms a support for the lower forward portion of the top plate 9 when the dust remover is in open position. The rear side and the front plates 10, 11 preferably closely approach the furnace room floor, as indicated in Figs. 1 and 4, so that a restricted cold air inlet is provided adjacent to the lower extremities of these plates. The front side plate 22 is attached to an upright angle bar 13 which is riveted or otherwise secured to the casing 2, by means of hinges 18 having vertical pivots, and has an upper inclined edge which is coactable with and forms a support for one side of the top plate 9, when the dust remover is open. The front side plate 22 has its lower edge spaced a considerable distance above the furnace room floor, thereby providing a relatively large opening facing the furnace doors 3, 4, through which an ash receptacle 19 located within the opened dust remover, may be filled. While the dust remover has been shown as applied to the side wall of the furnace toward which the doors 3, 4 swing, it will be obvious that opening of the ash pit door 4 will not interfere with free delivery of ashes to the receptacle 19, and that the dust remover may also be readily applied to the other side of the furnace if so desired. The top plate 9 may also be provided with abutments adapted to engage the upright plates 10, 11, 22 to hold the structure in open position, and suitable clamps may also be provided for locking the remover in folded position, but these abutments and clamps are not a necessity.

The inclined discharge casing 8 is preferably located in direct contact with the heated upper inclined wall of the furnace casing 2, and communicates directly with a horizontal casing or conduit 7 which is likewise preferably located as near to the top of the furnace as possible so that the heat radiating upwardly from the furnace automatically heats the conduit 7. The conduit 7 is also constructed so as to cover as much of the furnace top, as possible, in order to provide a heat insulating air jacket for preventing overheating of structure such as joists which may be located directly above the casing 2. The discharge end of the conduit 7 is provided with a check valve 14, and communicates with the chimney 6 through the furnace gas discharge pipe 5.

As illustrated in Fig. 5, the inlet end of the conduit 7 may be provided with an exhauster or pump 20 operable by means of an electric motor 21 to augment the flow of gases through the dust remover and the conduit 7. Such mechanically actuated augmenting means, while desirable, has been found unnecessary, as sufficient flow is created by the combined heating of the conduit 7 and the natural draft in the chimney 6, to insure efficient operation of the device.

During normal operation of the furnace, the dust remover is in folded position as shown in Figs. 6, 7 and 8, and the check valve 14 is closed in order to prevent air from entering the furnace discharge pipe 5 through the conduits 8, 7. When the dust remover is folded, the front side plate 22 lies directly against the side wall of the casing 2 directly below the side wall of the casing 2, the front plate 11 lies against the side plate 22, the rear side plate 10 lies against the side plate 22 and the front plate 11, and the top plate 9 lies against the side plate 10. By forming the side plates 10, 11, 22 and the top plate 9 to generally conform with the contour of the casing wall, the folded dust collector presents a neat appearance and occupies very little space.

When it is desired to remove ashes from the furnace ash pit, the dust remover is opened by swinging the top plate 9 away from the furnace wall and adjusting the side and front plates 10, 11, 22 to the positions indicated in Figs. 1, 2, 3 and 4, wherein the top plate 9 rests upon the upper edges of the side and front plates and the side flanges of the top plate prevent outward displacement of the side plates 10, 22. The damper 14 should then be opened and an ash receptacle 19 placed within the dust remover. With the elements thus positioned, the air in the conduit 7 which is heated by radiation from the furnace, escapes to the chimney 6 through the discharge pipe 5 thereby inducing a flow of air through the dust remover casing. This flow of air may be augmented by operation of the pump 20 with the aid of the motor 21, shown in Fig. 5. The air enters the dust remover casing through the space below the side and front plates 10, 11 and through the large opening which faces the furnace doors 3, 4. When a flow of air through the dust remover has been thus established, the ash pit door 4 may be opened and ashes removed from the ash pit and deposited in the receptacle 19. The air rushing into and through the dust remover casing will automatically carry with it any dust which may be raised during the ash removing operation, in front of the furnace and in the vicinity of the receptacle 19, and the dust laden air is quickly delivered up the chimney 6. It has been found that the natural flow induced by the heated air in the conduit 7, will create sufficient suction to withdraw dust laden air from a considerable radius around the remover, and that this radius may be greatly enlarged by employing a fan or pump 20 in addition to the heated conduit 7 for creating a flow.

After the ashes have been deposited in the receptacle 19, the receptacle may be removed and the ash dust remover again collapsed to the position shown in Figs. 6, 7 and 8, or allowed to remain open for future use. The check valve 14 should however be closed in order to preserve efficient operation of the furnace.

It will be obvious that the provision of the air chamber or conduit 7 above the furnace casing 2, serves to prevent overheating of structure located in proximity to the top of the furnace. The entire structure may be manufactured at relatively low cost and may be furnished as an integral part of the standard furnace unit. The dust remover does not interfere with the construction and operation of the furnace and effectively prevents dust laden air from permeating the atmosphere of the furnace room.

It should be understood that it is not desired to limit the invention to the exact details of construction and operation herein shown and described, for obvious modifications within the scope of the claims may occur to persons skilled in the art.

It it claimed and desired to secure by Letters Patent:—

1. In combination, a heater having an ash removal door at its bottom and a gas discharge conduit near its top, a dust remover hood supported directly by a wall of said heater at one side of said door, said remover hood comprising sheet metal plates pivotally associated with said wall and collapsible directly thereagainst, and means forming a conduit connecting the upper portion of said hood with said gas discharge conduit.

2. In combination, a heater having an ash removal door at its bottom and a gas discharge conduit near its top, a dust remover hood supported directly by a side wall of said heater at one side of said door, said hood comprising sheet metal plates pivotally associated with said wall and collapsible directly thereagainst, and means forming a conduit extending in direct contact with the top of said heater and connecting the upper portion of said hood with said gas discharge conduit.

3. In combination, a heater having an ash removal door at its bottom and a gas discharge conduit near its top, a dust remover hood supported directly by a horizontally curved side wall of said heater at one side of said door, said hood comprising curved plates pivotally associated with said wall and collapsible directly thereagainst so that the curvature of said plates follows the contour of said wall, and means forming a conduit connecting said hood with said gas discharge conduit.

4. In combination, a heater having an ash removal door at its bottom and a gas discharge conduit near its top, a dust remover hood supported directly by a side wall of said heater at one side of said door, said hood comprising plates pivotally associated with said wall and collapsible directly thereagainst, the hood plate nearest said door having a lower edge above the top of said door and the other plates comprising walls of said hood extending below the top of said door, and means forming a conduit connecting said hood with said gas discharge conduit.

5. In combination, a heater having an ash removal door and a gas discharge conduit, a dust remover hood supported directly by a wall of said heater at one side of said door, said remover hood comprising a front and two side plates, the side plate nearest said door being located entirely above said door and the front and other side plate extending below the top of said door, and means forming a conduit connecting said hood with said gas discharge conduit.

6. In combination, a heater having an ash removal door and a gas discharge conduit, a dust remover hood supported directly by a curved side wall of said heater at one side of said door, said hood comprising outwardly curved side walls and an inwardly curved front wall pivotally supported by one of said side walls, and the walls of said hood being foldable against said heater wall, and means forming a conduit connecting said hood with said gas discharge conduit.

7. In combination, a heater having an ash removal door and a gas discharge conduit, a dust remover hood supported directly by a curved side wall of said heater at one side of said door, said hood comprising outwardly curved side walls and an inwardly curved front wall, one of said side walls being shorter than the other and said walls of said hood being foldable against said heater wall so that all of said walls are substantially parallel to each other, and means forming a conduit connecting said hood with said gas discharge conduit.

8. In combination, a heater having an ash removal door and a gas discharge conduit, a dust remover hood supported directly by a wall of said heater at one side of said door, said remover hood comprising a front and two side walls, the side wall nearest said door being located entirely above said door and the front and other side wall extending below the top of said door, and means forming a conduit extending in direct contact with the top of said heater and connecting the upper portion of said hood with said gas discharge conduit.

In testimony whereof, the signature of the inventor is affixed hereto.

ARTHUR W. PEFFER.